R. W. BURNETT.
AUTOMATIC LOCK NUT.
APPLICATION FILED NOV. 30, 1915.

1,228,881.

Patented June 5, 1917.

Witnesses
F. Windridge

Inventor
Ralph W. Burnett
By Victor J. Evans
Attorney

UNITED STATES PATENT OFFICE.

RALPH W. BURNETT, OF WESTWOOD, CALIFORNIA.

AUTOMATIC LOCK-NUT.

1,228,881.     Specification of Letters Patent.      Patented June 5, 1917.

Application filed November 30, 1915. Serial No. 64,324.

*To all whom it may concern:*

Be it known that I, RALPH W. BURNETT, a citizen of the United States, residing at Westwood, in the county of Lassen and State of California, have invented new and useful Improvements in Automatic Lock-Nuts, of which the following is a specification.

This invention relates to improvements in nut locking devices and especially with reference to the provision of a nut of special construction and a key washer and locking spring which coact with the nut and with a base element to automatically lock the nut when the same is screwed up on the bolt and effectually prevent the nut from working loose but which enables the nut to be removed when desired.

The invention consists in the features of construction, combination and arrangement of devices herein fully described and claimed.

In the accompanying drawings:—

Figure 1 is an elevation of a bolt and a sectional view of the nut locking devices on the bolt constructed and arranged in accordance with my invention.

Figs. 2—3 are detail sectional views on the planes indicated by the lines *a—a* and *b—b*, respectively, of Fig. 1.

Figure 1:
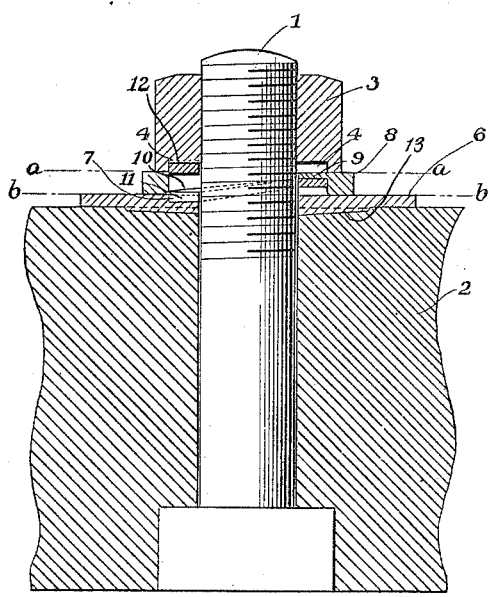
Figure 2:
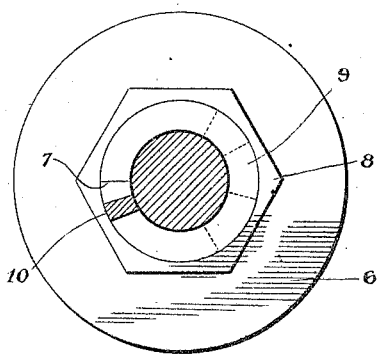
Figure 3:
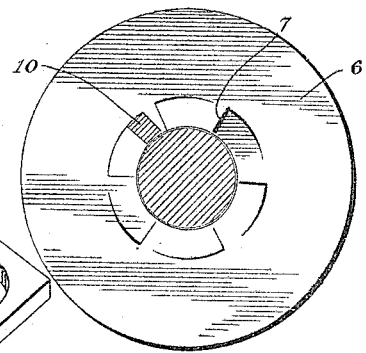
Figure 4:
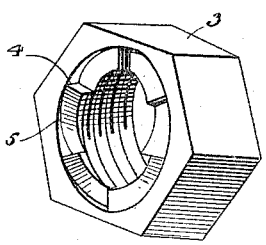
Fig. 4 is an inverted detail perspective view of the nut.
Figure 6:
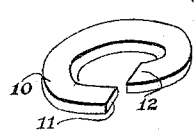
Fig. 6 is a detail perspective view of the key washer.
Figure 5:
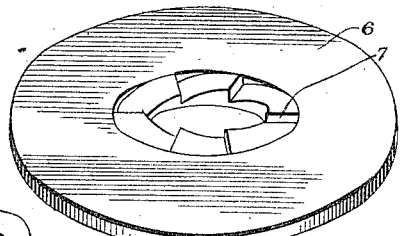
Fig. 5 is a detail perspective view of the base washer.
Figure 7:
Fig. 7 is a similar view of the annular locking spring.

The bolt 1 is here shown of the usual construction and is shown as arranged in and passing through an opening in a beam or other object 2. The nut 3 is provided on its inner face with segmental teeth 4, each of which has an inclined face 5, the corresponding faces of all of the teeth being inclined in the same direction.

A base element is here indicated as a washer 6, having an opening through which the bolt passes, and said base element or washer is provided in its outer side with teeth 7 which correspond with those of the nut. These teeth may be formed in any base element and as desired may be formed directly on the work or object through which the bolt extends, within the scope of my invention. I would have it understood that the base element may be of any suitable construction and is not necessarily a washer. I also provide a key washer 8 which is arranged on the bolt between the nut and the base element, and has an opening through which the bolt extends and said key member has a segmental enlargement 9 which projects into said opening. An annular locking spring 10 is arranged in the said opening and is open at one side and its ends 11—12 are sprung apart and engaged respectively with a tooth of the nut and a tooth of the base element or washer 6. The teeth and the spring enable the nut to be turned by a wrench and serve by their coaction to automatically and securely lock the nut on the bolt.

To loosen or take off the nut the bolt must be held against turning by any suitable means, a wrench used on the nut and a second wrench used on the key washer and manipulated to turn the key washer while the nut is being held against turning, a sufficient distance to cause the end 12 of the locking spring to be disengaged from the tooth of the nut. The key washer is then held against rotation and the nut reversely turned and freely taken from the bolt. The base washer is provided with biting flanges 13 on its outer side to engage in the surface of the bolted material or member 2.

Having thus described my invention, I claim:—

In combination with a bolt or the like, a base element through which the bolt extends, and having segmental teeth on its outer side around the bolt, each of said teeth having an inclined face, a nut on the bolt having corresponding segmental teeth on its inner side, a key washer between the base element and the nut, and through which the bolt extends, said key washer having a segmental enlargement at one side of the opening therein and presenting an inclined camming face on the side opposed to the nut and spaced from the inner surface of the key washer, said key washer being thicker than said segmental enlargement and an annular locking spring open at one side, arranged in the opening of the key washer and between the nut and the base element and having its ends sprung in opposite directions and respectively engaged with a tooth of the base element, and a tooth of the nut, the said segmental enlargement of the key washer being arranged under one side of said locking spring.

In testimony whereof I affix my signature in presence of a witness.

RALPH W. BURNETT.

Witness:
JAMES J. KERRIGAN.

Copies of this patent may be obtained for five cents each, by addressing the "Commissioner of Patents, Washington, D. C."